US008907595B2

(12) United States Patent
Weibel et al.

(10) Patent No.: US 8,907,595 B2
(45) Date of Patent: Dec. 9, 2014

(54) AIRCRAFT ENGINE NACELLE COMPRISING A MOBILE COWL MOVED BY ELECTRIC MOTORS

(75) Inventors: Jean-François Weibel, Paris (FR); Jérôme Piaton, Paris (FR); Pierre Baudu, Criquetot L'Esneval (FR); David Pereira, Limours (FR)

(73) Assignees: Sagem Defense Securite, Paris (FR); Aircelle, Gonfreville-l'Orcher (FR)

( * ) Notice: Subject to any disclaimer, the term of this patent is extended or adjusted under 35 U.S.C. 154(b) by 593 days.

(21) Appl. No.: 13/320,360

(22) PCT Filed: May 19, 2010

(86) PCT No.: PCT/EP2010/056924
§ 371 (c)(1),
(2), (4) Date: Dec. 7, 2011

(87) PCT Pub. No.: WO2010/136369
PCT Pub. Date: Dec. 2, 2010

(65) Prior Publication Data
US 2012/0107109 A1 May 3, 2012

(30) Foreign Application Priority Data
May 28, 2009 (FR) ...................................... 09 02578

(51) Int. Cl.
| | |
|---|---|
| H02K 7/14 | (2006.01) |
| F02K 1/76 | (2006.01) |
| B64D 29/06 | (2006.01) |
| B64D 33/04 | (2006.01) |
| H02P 5/74 | (2006.01) |
| H02P 9/00 | (2006.01) |
| B64F 5/00 | (2006.01) |

(52) U.S. Cl.
CPC ................ *F02K 1/763* (2013.01); *B64D 29/06* (2013.01); *B64D 33/04* (2013.01); *H02P 5/74* (2013.01); *H02P 9/007* (2013.01); *B64F 5/00* (2013.01); *H02P 2009/005* (2013.01); *H02P 2207/01* (2013.01); *Y02T 50/672* (2013.01)
USPC ............... 318/3; 318/748; 318/747; 318/739; 318/727

(58) Field of Classification Search
CPC ......................................................... H02P 5/74
USPC .............................. 318/3, 748, 747, 739, 727
See application file for complete search history.

(56) References Cited

U.S. PATENT DOCUMENTS 3,688,171 A * 8/1972 Salihi et al. ................... 318/759
6,340,135 B1 1/2002 Barton

FOREIGN PATENT DOCUMENTS

| EP | 0 843 089 A1 | 5/1998 |
|---|---|---|
| FR | 1 326 910 A | 5/1963 |
| GB | 2 274 490 A | 7/1994 |

*Primary Examiner* — David S Luo
(74) *Attorney, Agent, or Firm* — Muncy, Geissler, Olds & Lowe, P.C.

(57) ABSTRACT

A nacelle for receiving an aircraft engine, the nacelle having a tubular stationary cover and at least one movable portion connected to the stationary cover via movement means for moving the movable portion between a position close to the stationary cover and a position spaced apart therefrom. The movement means have asynchronous motors, each having a stator with windings connected in parallel to a power supply circuit and a rotor having windings, each connected to a resistive load in parallel with a winding of the rotor of each of the other motors.

6 Claims, 1 Drawing Sheet

AIRCRAFT ENGINE NACELLE COMPRISING A MOBILE COWL MOVED BY ELECTRIC MOTORS

FIELD OF THE INVENTION

The present invention relates to an aeroengine nacelle arranged for fairing and attaching the engine to a structural portion of the aircraft, such as a wing or the fuselage. The invention relates more particularly to the nacelles for bypass turbojets that are provided with thrust reverser means comprising movable walls, lobes, gates, or vanes, for redirecting the secondary air stream towards the front.

BACKGROUND OF THE INVENTION

Such a nacelle generally comprises a stationary cover surrounding the front portion of the engine (around the fan), and a movable cover made up of one or two parts surrounding the portion of the engine that incorporates the thrust reverser means. The movable cover is mounted on slideways so as to slide between a position close to the stationary cover and a position spaced apart therefrom. In the close position, the movable cover closes exhaust openings for the secondary air stream, whereas in the spaced apart position the movable cover uncovers said openings so as to allow the stream of air that is redirected towards the front to escape, thereby reversing the thrust of the jet.

Conventionally, the means for causing the movable cover to slide are hydraulic actuators associated with mechanical synchronization means so as to ensure that the actuator rods move simultaneously.

One of the currently-developing trends in aviation is to replace hydraulic actuators with electromechanical actuators comprising electric motors, in order to save weight, to simplify maintenance, and to provide greater flexibility in controlling said actuators. The hydraulic actuators are generally replaced by electric actuators each comprising an electric motor driving a wormscrew having mounted thereon a nut that is connected to the member that is to be moved.

Applying electromechanical actuators to moving the movable cover of the nacelle has nevertheless been hindered by using composite materials instead of the metal that was traditionally used for making covers. Covers that are made of composite materials are less rigid than those that are made of metal, thereby requiring the actuators that act on the moving cover to be synchronized accurately in order to avoid twisting or damaging it. One solution that has been adopted makes use of a single electric motor connected by flexible shafts to actuators, each comprising a wormscrew having mounted thereon a nut that is connected to the moving cover. The flexible shafts constitute ten percent of the total weight of the movement means, they complicate installing the movement means on the nacelle, and they require constraining periodic maintenance operations.

It might be thought that it would be possible to use a plurality of electric motors that are servo-controlled in position. The control electronics and the driver software needed for synchronizing the motors would nevertheless be complex. A position-detector module would also need to be associated with each motor.

SUMMARY OF THE INVENTION

An object of the invention is to provide simple means for moving the movable cover.

To this end, the invention provides a nacelle for receiving an aircraft engine, the nacelle comprising a tubular stationary cover and at least one movable portion connected to the stationary cover via movement means for moving the movable portion between a position close to the stationary cover and a position spaced apart therefrom, the movement means comprising asynchronous motors, each having a stator with windings connected in parallel to a power supply circuit and a rotor having windings, each connected to a resistive load in parallel with a winding of the rotor of each of the other motors.

The windings of the rotors are thus interconnected. The rotating fields in the stators have characteristics that are identical and the rotating fields in the rotors rotate at the same speed without that necessarily requiring the rotors to be subjected to forces that are identical (the forces applied to the rotors should nevertheless be in the same direction, which corresponds to the nominal situation of moving a movable nacelle cover). The movement means are thus synchronized in a manner that is particularly simple by the way in which the rotors are interconnected and by using only one electronic control circuit. The movement means are also of a structure that is relatively light and compact.

In alternative embodiments:
the resistive load comprises resistors connected to one another in a star configuration; or
the resistive load comprises an inverter circuit connected to the power supply circuit.

The first embodiment is of a structure that is particularly simple, lightweight, compact, and inexpensive. The second embodiment serves to optimize the overall electrical efficiency of the movement means.

Preferably, a current-measuring cell is connected in the outlet of at least one of the windings of one of the rotors.

The output current from the rotor is the image of the current flowing through the stator and it can be used as a motor control parameter. There is then no need to use sensors incorporated in the motors.

BRIEF DESCRIPTION OF THE DRAWINGS

Other characteristics and advantages of the invention appear on reading the, following description of a particular, non-limiting embodiment of the invention.

Reference is made to the accompanying drawings, in which.

DETAILED DESCRIPTION OF THE PREFERRED EMBODIMENTS

Figure 1:
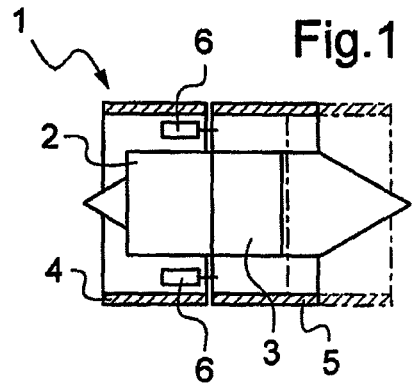
FIG. 1 is a diagrammatic longitudinal section view of the nacelle in accordance with the invention.

With reference to FIG. 1, the invention relates to a nacelle, given overall reference 1, for receiving an aeroengine, here a bypass turbojet 2 that includes a thrust reverser referenced 3. The thrust reverser 3, which comprises for example plates or vanes for redirecting the stream from the engine towards the front, is itself known and is not described in greater detail herein.

The nacelle 1 comprises two tubular portions in axial alignment, namely a stationary cover 4 surrounding the front portion of the turbojet 2 and a moving cover 5 surrounding a portion of the turbojet 2 that is adjacent to the front portion thereof, and that includes the thrust reverser 3. The movable cover 5 may comprise a single piece having an O-shaped cross-section with an upwardly-directed opening for passing the pylon that fastens the engine under the wing, or it may comprise two pieces of C-shaped cross-section that interfit on either side of the turbojet 2. The movable cover 5 is mounted in known manner on slideways to slide between a position in which it is close to the stationary cover 4, in which the movable cover 5 covers the thrust reverser 3, and a position in which it is spaced apart from the stationary cover 4, in which the movable cover 5 uncovers the thrust reverser 3.

Figure 2:
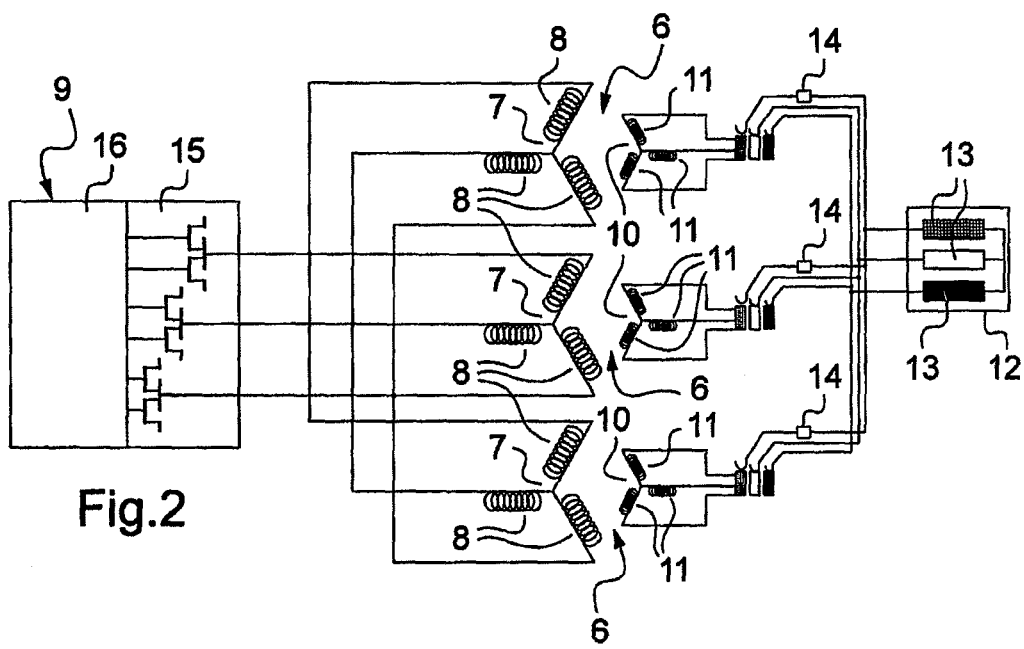
FIG. 2 is a diagram of the motor power supply circuit.

With reference also to FIG. 2, the nacelle includes means for moving the movable cover 5 between its two positions.

These means comprise asynchronous electric motors 6 that are distributed on the stationary cover 4 and that have respective outlet shafts driving wormscrews, each having mounted thereon a nut that is secured to the movable cover 5.

Each motor 6 comprises a stator 7, here having three windings 8. The windings 8 of the stators 7 of the motors 6 are connected in parallel to a power supply circuit 9 that includes, in known manner, an inverter circuit 15 controlled by a control circuit 16.

Each motor 6 has a respective rotor 10, each rotor having three windings 11 in this example. The windings 11 of the rotors 10 of the motors 6 are connected to a resistive load 12. In this example, the resistive load 12 comprises three resistors 13 connected in a star configuration. Each winding 11 of each rotor 10 is connected to one of the resistors 13 in parallel with one of the windings 11 of each of the other two rotors 10. The electrical connection between the resistors 13 and the windings 11 of the rotors 10 is provided by means of slip rings or any other device allowing electrical contact to be made between a stationary element and a rotary element. The resistors 13 all have the same resistance. This resistance serves to determine the stiffness of the system.

A current-measurement cell 14 is connected to the output of one of the windings 11 of each rotor 10 and is connected to the control circuit 16. The current-measurement cell 14 serves to avoid using sensors incorporated in the motors.

The speed of each motor 6 can thus be evaluated and the control circuit 16 causes the motors 6 to stop whenever it detects a speed difference greater than a predetermined threshold.

Figure 3:
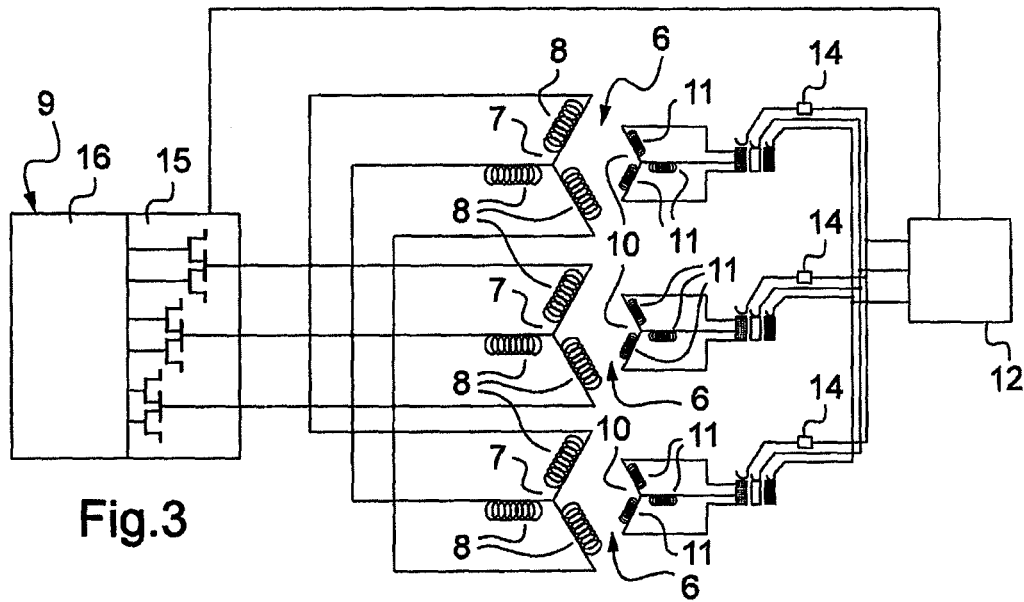
FIG. 3 is a diagram of a variant embodiment of the power supply circuit.

In the variant of FIG. 3, the resistive load 12 comprises an inverter circuit connected to the input of the power supply circuit 9 so as to reinject energy taken at the output of the rotors 10 back into the inverter circuit 15 of the power supply circuit 9.

Naturally, the invention is not limited to the embodiments described but covers any variant coming within the ambit of the invention as defined by the claims.

In particular, the invention can be used for moving any moving part of the nacelle.

In addition, the invention applies to nacelles fitted with any type of thrust reverser, with vanes, lobes, or gates (e.g. of the "clamshell" or the "bucket" type).

Figure 4:
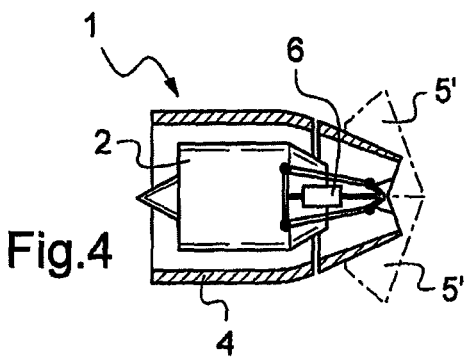
FIG. 4 is a view analogous to FIG. 1 showing a nacelle in a variant embodiment.

Thus, FIG. 4 shows a motor 2 surrounded by a nacelle 1 having a stationary cover 4 and moving portions in the form of pivotally-mounted gates 5'. The gates are curved about an axis that is substantially perpendicular to a pivot axis of the gates. The gates 5' are movable between a position close to the stationary cover in which they extend the stationary cover and define remote from the stationary cover an opening for exhausting the stream of gas, and a position spaced apart from the stationary cover in which the gates come into contact with one another remote from the stationary cover and co-operate with the stationary cover to define an outlet opening for the gas stream.

What is claimed is:

1. A nacelle for receiving an aircraft engine, the nacelle comprising a tubular stationary cover and at least one movable portion connected to the stationary cover via movement means for moving the movable portion between a position close to the stationary cover and a position spaced apart therefrom, wherein the movement means comprise asynchronous motors, each having a stator with windings connected in parallel to a power supply circuit and a rotor having windings, each connected to a resistive load in parallel with a winding of the rotor of each of the other motors.

2. The nacelle according to claim 1, wherein the resistive load comprises resistors connected to one another in a star configuration.

3. The nacelle according to claim 1, wherein the resistive load comprises an inverter circuit connected to the power supply circuit.

4. The nacelle according to claim 1, wherein a current-measuring cell is connected in the outlet of at least one of the windings of one of the rotors.

5. The nacelle according to claim 1, wherein the movable portion is a slidably-mounted tubular cover.

6. A The nacelle according to claim 1, including two movable portions in the form of pivotally-mounted gates, the portions being curved about an axis that is substantially perpendicular to a pivot axis of the gates.

* * * * *